Patented Sept. 22, 1931

1,824,496

UNITED STATES PATENT OFFICE

CLINTON HENRY PARSONS, OF CHICAGO, ILLINOIS, ASSIGNOR TO SWIFT & COMPANY, OF CHICAGO, ILLINOIS, A CORPORATION OF ILLINOIS

FOOD PRODUCT AND METHOD OF MAKING

No Drawing.   Application filed April 20, 1928. Serial No. 271,650.

This invention relates to improvements in food products; and includes the food products themselves as new products and an improved method of manufacture.

The invention includes a new caramelized and hydrolyzed milk product having a distinctive aroma and taste and valuable emulsifying properties.

The invention also includes the new method of treating milk to produce the caramelized and hydrolyzed milk product.

Milk is extensively used as food both in its natural state and in its concentrated and dried state and both alone and in combination with other food products. Milk itself has little flavor or taste and when blended with other foods it is not usually regarded as a flavoring material or as imparting any characteristic or distinctive flavor.

According to the present invention milk is subjected to caramelizing and hydrolysis under regulated conditions to give a new milk product of distinctive flavor and taste which in itself forms a valuable food product and which has valuable properties adapting it for use for blending with other food products to which it imparts a distinctive flavor and taste. The new caramelized and hydrolyzed milk product is a valuable product for blending with cheese to form a composite product having a flavor and taste due in part to that of the cheese and in part to that of the caramelized milk product. This composite product forms a valuable material for using in place of butter or salad dressing or soft cheese for spreading on bread to make sandwiches, etc.

In forming the new caramelized and hydrolyzed milk product, milk in a suitable state of concentration is subjected to a caramelizing treatment with hydrolysis of the proteins in such a manner as to form a large percentage of protein hydrate in the product and to impart to it a distinctive aroma and taste. This method of production will be illustrated by the following specific example.

Powdered milk, either whole milk or skim milk, is mixed with water in the proportion of about 3 parts of milk powder (dry basis) to 1 part of water. About 2 to 4% of an emulsifying salt is added at this point. Such salt may be an alkaline or acid salt of citric, tartaric or phosphoric acid, such as potassium acid tartrate, etc. The mixture is then transferred to a kettle equipped with an agitator and with a steam jacket so arranged as to permit live steam to be injected directly into the kettle. The agitator is set in motion and live steam injected directly into the product within the kettle. The temperature of the milk product is raised quickly to about 90 to 95° C. The live steam is then turned off and this temperature then maintained by means of the steam jacket.

The product is moderately agitated for a period of from twenty minutes to one hour, at the end of which time the product will have taken on a brownish yellow color and will have an aroma resembling that of highly roasted beef. The time of heating and agitation can be materially shortened and the product improved if the treatment of the milk is carried out in a closed vessel equipped with an agitator and maintained under a pressure due to generated steam of about fifteen pounds.

The product thus produced has a distinctive and characteristic flavor and taste and may be employed as a food product or as a constituent of food products to which it will impart its characteristic flavor and taste.

This milk product can be further treated to make it more valuable as an agent for combining with other food products and particularly for use as an emulsifying agent or for combining with cheese, etc. to form an emulsified and homogenized product. For this purpose calcium lactate either in the form of hot concentrated solution or in the form of finely ground powder is added. The mass then assumes a somewhat grainy appearance and materially thickens. The amount of calcium lactate required to thicken the product will vary somewhat but in general from about ½ to 5% of the weight of the milk product may be used. Agitation is continued while maintaining the temperature of the product for a period of five to ten minutes or more, at the end of which time the product will be converted into the form of a granular product with infinitely small grains such that the product resembles in texture that of smooth cream. This product has special properties as an emulsifier for combining with cheese and other products to form homogeneous intermixtures therewith.

An alternative method of producing a product having a texture composed of infinitely small grains is as follows: The milk, which has been subjected to the caramelizing and hydrolyzing treatment, is allowed to drop to 140°-150° F. It is then continuously agitated over a period of from one to two hours, this temperature being maintained during this period. This process produces practically the same effect as does the calcium lactate. The principal advantage of the use of this chemical is that it shortens the time of the processing.

This new milk product itself has a characteristic flavor and taste, resembling that of roast beef, and may be employed as a food product or for compounding with other food products to which it imparts a distinctive flavor.

The milk product produced as above described forms a valuable emulsifier for cheese and gives an emulsified and homogenized product from which there is little or no tendency toward separation of butter fat from the cheese.

Other new food products can be prepared by blending the new milk product with a variety of other food products, or by blending the new milk product with cheese and then further blending other food products therewith. Relishes, such as pickles, pimento, chili sauce and other condiments, etc. may be incorporated in a finely divided state to modify the flavor or taste or composition of the new products. Such products may be employed as salad dressings or sandwich fillings or for other purposes.

When the new milk product is blended with cheese without the addition of other ingredients the composite product will have a taste and flavor which is in part due to the cheese taste and flavor and in part to that of the caramelized and hydrolyzed milk.

The caramelized milk product forms a valuable emulsifying agent for emulsifying bacon grease and fried bacon and for then blending with cheese to form a new cheese product containing bacon fat and fried bacon emulsified therewith, as more fully set forth in my companion application Serial No. 271,649.

It will be understood that the particular method of treating the milk for the production of the caramelized and hydrolyzed milk product can be varied somewhat and that the kinds of cheese, etc. incorporated therewith can also be varied without departing from the spirit and scope of the invention.

I claim:
1. The process of treating milk which comprises subjecting the milk in a concentrated state to a caramelizing and hydrolyzing treatment in the presence of a stabilizing agent to produce a product containing caramelized milk sugar and hydrolyzed protein.

2. The process of treating milk which comprises subjecting the milk in a concentrated state to a caramelizing and hydrolyzing treatment in the presence of an emulsifying salt to produce a product containing caramelized milk sugar and hydrolyzed protein.

3. The process of treating milk which comprises subjecting the milk in a concentrated state to a caramelizing and hydrolyzing treatment in the presence of an emulsifying salt to produce a product containing caramelized milk sugar and hydrolyzed protein, said treatment being carried out at a temperature around 90-95° C. or higher, and being regulated to give a product having an aroma resembling that of roast beef.

4. The process of treating milk which comprises subjecting the milk in a concentrated state to a caramelizing and hydrolyzing treatment in the presence of a stabilizing agent to produce a product containing caramelized milk sugar and hydrolyzed protein and agitating the resulting product while still hot with the addition of calcium lactate to produce a product of smooth texture and valuable emulsifying properties.

5. The process of treating milk which comprises subjecting the milk in a concentrated state to a caramelizing and hydrolyzing treatment in the presence of an emulsifying salt to produce a product containing caramelized milk sugar and hydrolyzed protein and agitating the resulting product while still hot with the addition of calcium lactate to produce a product of smooth texture and valuable emulsifying properties.

6. The method of treating caramelized and hydrolyzed milk which comprises agitating the same in a heated state with the addition of calcium lactate.

7. A new concentrated milk product comprising caramelized and hydrolyzed milk.

8. A new concentrated milk product comprising caramelized and hydrolyzed milk containing an emulsifying salt.

9. A new concentrated milk product comprising caramelized and hydrolyzed milk containing calcium lactate.

10. A concentrated milk product comprising caramelized and hydrolyzed milk in the form of a smooth, creamlike product having valuable emulsifying properties.

In testimony whereof I affix my signature.

CLINTON HENRY PARSONS.